United States Patent [19]
Hsu et al.

[11] Patent Number: 5,338,622
[45] Date of Patent: Aug. 16, 1994

[54] THERMAL CONTROL APPARATUS

[75] Inventors: Michael S. Hsu, Lincoln; Ethan D. Hoag, East Boston, both of Mass.

[73] Assignee: Ztek Corporation, Waltham, Mass.

[21] Appl. No.: 45,996

[22] Filed: Apr. 12, 1993

[51] Int. Cl.⁵ .............................. H01M 8/04
[52] U.S. Cl. ...................... 429/26; 429/34; 429/120
[58] Field of Search .......... 429/26, 30, 34, 120; 165/172, 177, 184, 168

[56] References Cited

U.S. PATENT DOCUMENTS

| | | | |
|---|---|---|---|
| 3,394,032 | 7/1968 | Danner | 136/86 |
| 3,432,353 | 3/1969 | Von Krusenstierna et al. | 136/86 |
| 3,460,991 | 8/1969 | White, Jr. | 136/86 |
| 3,505,114 | 4/1970 | Rohr | 136/86 |
| 3,526,548 | 9/1970 | Accorsi et al. | 136/86 |
| 3,526,549 | 9/1970 | Archer et al. | 136/86 |
| 3,554,808 | 1/1971 | Fischer et al. | 136/86 |
| 3,607,427 | 9/1971 | White | 136/86 |
| 3,616,334 | 10/1971 | Aker et al. | 204/129 |
| 3,964,930 | 6/1976 | Reiser | 136/86 |
| 4,042,483 | 8/1977 | Bouy et al. | 204/290 |
| 4,056,452 | 11/1977 | Campbell | 204/258 |
| 4,085,016 | 4/1978 | Janjua et al. | 204/104 |
| 4,087,976 | 5/1978 | Morrow, Jr. et al. | 60/643 |
| 4,197,362 | 4/1980 | Schmidberger et al. | 429/12 |
| 4,210,512 | 7/1980 | Lawrance et al. | 204/257 |
| 4,310,605 | 1/1982 | Early et al. | 429/18 |
| 4,478,918 | 10/1984 | Ueno et al. | 429/38 |
| 4,482,440 | 11/1984 | Kadija | 204/105 |
| 4,490,444 | 12/1984 | Isenberg | 429/31 |
| 4,490,445 | 12/1984 | Hsu | 429/32 |
| 4,574,112 | 3/1986 | Breault et al. | 429/26 |
| 4,583,583 | 4/1986 | Wittel | 165/46 |
| 4,623,596 | 11/1986 | Kamoshita | 429/26 |
| 4,629,537 | 12/1986 | Hsu | 204/15 |
| 4,721,556 | 1/1988 | Hsu | 204/258 |
| 4,853,100 | 8/1989 | Hsu | 204/256 |
| 4,945,010 | 7/1990 | Kaufman | 429/26 |
| 5,041,344 | 8/1991 | Kamoshita et al. | 429/26 |
| 5,082,753 | 1/1992 | Shimizu et al. | 429/26 |

OTHER PUBLICATIONS

Advanced Fuel Cell Development Progress Report for Apr.–Jun. 1983.
Annual Report Covering the Period Apr. 1, 1978 to Mar. 31, 1979 (Feduska et al.).

Primary Examiner—Anthony Skapars
Attorney, Agent, or Firm—Thomas J. Engellenner

[57] ABSTRACT

A heat exchanging apparatus including a working fluid and a structure for exchanging heat between the working fluid and an external environment. The structure includes at least one wall element having an external surface exposed to the external environment and an internal surface exposed to the working fluid such that heat can be exchanged between the environment and the working fluid by conductive heat transfer through the wall element. The apparatus further includes a reservoir element for providing a reservoir for the working fluid and a distribution element for distributing the working fluid along the wall element to provide isothermal heat exchange between the working fluid and the external environment. In one embodiment, the structure can be a double lumen tubular structure having an inner lumen which provides a reservoir for the working fluid, and an lumen where heat is exchanged between the working fluid and an external environment. The inner tube can be a porous structure with a plurality of pores that uniformly distribute the working fluid to the outer-lumen.

44 Claims, 3 Drawing Sheets

THERMAL CONTROL APPARATUS

BACKGROUND OF THE INVENTION

This invention relates to thermal control of processes and, in particular, to high temperature electrochemical converters and associated heat exchange units.

The "traditional" method for fuel cell thermal management is to force a cooling medium, either a liquid or gaseous coolant stream, through the fuel cell assembly. Cooling water is often employed for ambient temperature devices, and air can be employed for higher temperature fuel cells. In some instances, the same air which serves as the fuel cell's oxidant is used as a cooling medium as well. Typically, the coolant enters the fuel cell assembly at a temperature either at or near the fuel cell operating temperature. The cooling medium passes through the fuel cell and carries off the thermal energy by its sensible heat capacity. The volume flow of coolant required for this method is inversely related to the designed temperature rise of the cooling medium, which is determined either by the limited range of the electrochemical operation of the electrolyte, or in the case of fuel cells with ceramic components, by constraints associated with thermal stress.

The foregoing limitations on the temperature rise of the cooling medium result in coolant flow rates much higher than those required by the electrochemical reaction alone. Since these large flow quantities must be preheated and circulated, a dedicated reactant thermal management subsystem is required. Such thermal management subsystems normally include equipment for regenerative heating, pumping and processing of the excessive coolant flow. These additional components add substantially to the overall cost of the system.

For illustration purposes, consider a regenerative heat exchanger of a type suitable for preheating the fuel cell reactants and operating with a 100° C. temperature difference, and a typical heat transfer rate of 500 Btu/hr-ft$^2$ (0.13 W/cm$^2$). Further assuming a 50% cell efficiency with no excess coolant flow, and operating at an ambient pressure, the heat processing or heat transfer surface area of the regenerator would be of the same order of magnitude as the surface area of the fuel cell electrolyte. Considering an excess coolant flow requirement of 10 times the level required for the fuel cell reactant flow, a representative value for conventional approaches, the heat exchanger surface area would be 10 times larger than the active fuel cell surface area. The large size of this heat exchanger makes it difficult to integrate the heat exchanger with electrochemical converters to form a compact and efficient thermal management system.

Thus, there exists a need for better thermal control approaches, especially for use in electrochemical energy systems. In particular, an improved heat exchange system, having the capability of better regulating and maintaining the operating temperature of an electrochemical energy system, would represent a major improvement in the industry.

SUMMARY OF THE INVENTION

The present invention provides thermal management systems and devices for exchanging heat between a heat source and a heat sink. Heat exchanging structures are disclosed which have an isothermal surface temperature. Broadly, the invention employs gas diffusing structures to distribute a working fluid.

In one embodiment, the thermal management systems of the present invention include a gas permeable structure or medium for exchanging heat between a heat source and a heat sink. The structure can include at least one wall element having an external surface exposed to an external environment and an internal surface exposed to an internal environment, such that heat can be exchanged therebetween.

For example, the invention can be practiced with a tubular structure comprising one or more concentric cylinders that extend along a longitudinal axis. The cylinder preferably has a plurality of passageways extending therethrough. Alternatively, the cylinder can be a porous structure having a plurality of pores that uniformly distributes the working fluid.

In another embodiment, the structure can be formed as a multi-plate structure having a plurality of passageways or spaces disposed between the plates. The working fluid is transferred between the plates via the passageways.

In yet another embodiment of the invention, a double lumen structure is disclosed having a permeable inner tube structure having a plurality of pores formed therethrough that uniformly distributes a working fluid to an outer lumen, where heat can be exchanged between the working fluid and the external environment.

The isothermal apparatus can either operate as a heat source or a heat sink. When operating as a heat source, the working fluid is at a temperature greater than that of the external environment. Conversely, when the working fluid is cooler than the external environment, the apparatus functions as a heat sink.

The invention will next be described in connection with certain preferred embodiments. However, it should be made clear that various changes and modifications can be made by those skilled in the art without departing from the spirit or scope of the invention.

For example, various configurations of the above-described structure can be employed to achieve an isothermal heat exchanging surface. Moreover, although the structure is depicted as a cylindrical, tubular structure, the structure can have a square, rectangular or other geometric shape. (The terms "tube" and "tubular" as used herein are intended to describe various geometric structures of elongated shape having a longitudinal axis and at least one internal lumen which serves as a conduit for a working medium.) Various permutations of design elements, especially in the construction of heat exchangers and fuel cells will be apparent to those skilled in the art (e.g. configuration of electrodes and electrolytes, manifolding of gases, scaling of elements and choices of materials) and should be understood to be equivalent to those described herein.

DETAILED DESCRIPTION

Figure 1:
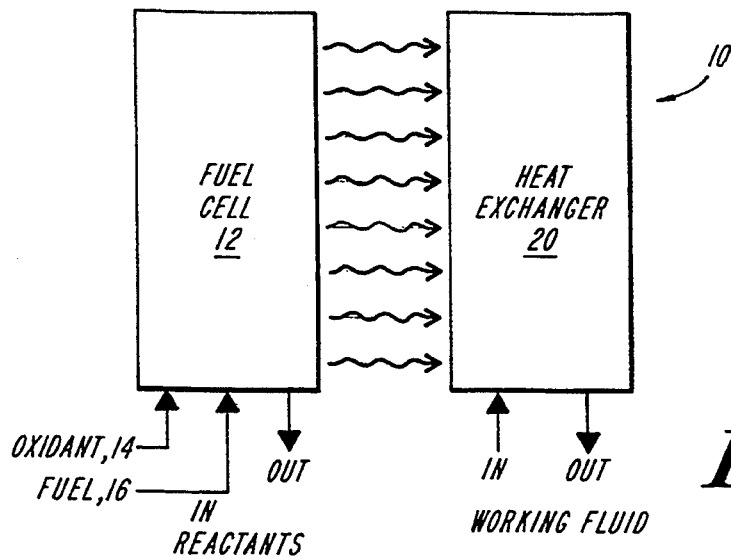
FIG. 1 is a block diagram of a thermal control system according to the present invention.

FIG. 1 depicts a block diagram of a thermal management system 10, including a heat source (fuel cell assembly) 12 having air and fuel reactant inputs, and a heat sink (heat exchanger) 20 employing a working fluid. The fuel cell assembly 12 radiates heat to the heat exchanger 20 (shown as wavy arrows).

The fuel cell assembly 12 can comprise a stack of electrochemical cell units as described, for example, in U.S. Pat. No. 4,629,537 to Hsu, issued on Dec. 16, 1986, and is herein incorporated by reference. The cell unit in the electrochemical cell stack can comprise an electrolyte/electrode sandwich and an interconnector plate. The interconnector plate serves as the electric connector between adjacent electrolyte plates and as a partition between the fuel 16 and oxidant 14 gases, as well as providing a heat conduction path along the electrode surfaces and to the outer edges of the plates. For optimal operation, the fuel cell assembly should also be designed for isothermal operation in order to match the isothermal nature of the heat exchanger. The term "electrochemical cell unit" is intended to cover an electrochemical converter that is capable of operating in an electrolyzer cell mode (i.e., a heat sink), a fuel cell mode (i.e., a heat source), and as a burner.

The heat exchanger 20 serves to facilitate the removal from, or addition of thermal energy to, the fuel cell assembly 12. The heat transfer between the heat exchanger 20 and the fuel cell 12 relies upon thermal radiation. The radiative thermal coupling is capable of high heat flux. It offers mechanical decoupling, and thus relaxes constraints in design and material selections of the heat exchanger elements. Those of ordinary skill will also realize that the heat exchanger can be placed in contact with, or be physically integrated with the fuel cell, allowing the transfer of heat to take place by thermal conduction, rather than by thermal radiation.

The heat exchanger 20 and the fuel cell 12 can be arranged in any variety of ways. For example, the heat exchanger 20 can be interdigitated with the fuel cell assembly 12 as shown and described in U.S. Pat. No. 4,853,100 to Hsu, which issued Aug. 1, 1989, and is herein incorporated by reference. The heat exchanger can operate as a closed-cycle with a recirculating (or regenerated) working fluid or it can be operated in an open plenum mode with the fuel cell's spent reactants serving as fluid of the heat exchanger.

Figure 2:
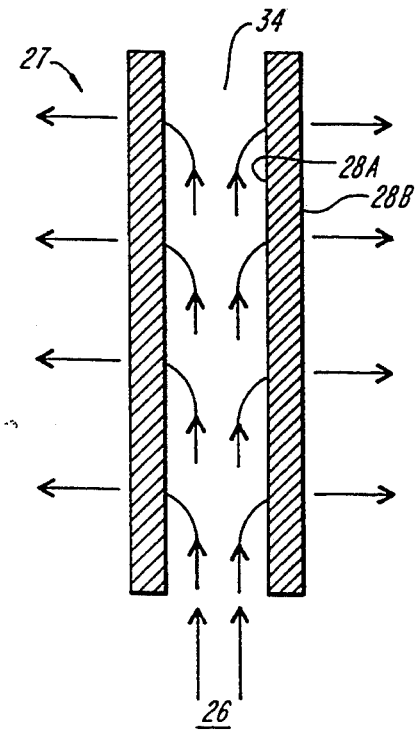
FIG. 2 is a cross-sectional side view of an apparatus for temperature management employing a porous structure.

FIG. 2 shows one embodiment of an isothermal structure (heat exchanger) according to the present invention. The heat exchanger 27 has a porous structure 28, which receives radiated heat from its environment (e.g., from a nearby fuel cell). The working fluid 26 flows from the inner passageway or reservoir 34 and permeates radially outward until it reaches the medium's outer face 28B. An outer duct can be provided to collect the heated working fluid 26 and convey it to other parts of the energy system. To assure the axial and azimuthal uniformity of the working fluid 26 rate of flow, the radial pressure drop as the working fluid permeates through the structure 28 is maintained to be substantially greater pressure of the working fluid 26 as it flows through the reservoir 34. An inner flow distribution tube may be added to enhance the flow uniformity.

Figure 3:
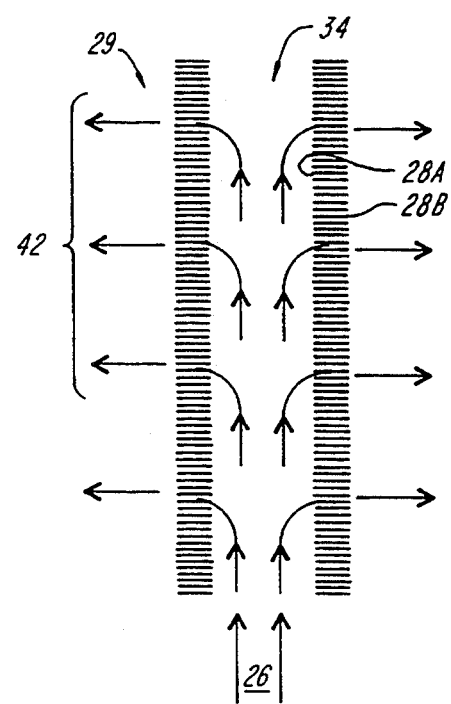
FIG. 3 is a cross-sectional side view of another apparatus for temperature management employing a plurality of plates.

A heat exchanger apparatus according to the present invention can also employ a plurality of plates, as depicted in FIG. 3. The heat exchanger 29 includes a series of plates 42 that are stacked on top of each other, as shown. A central fluid passageway or reservoir 34 connects the plates 42, while spaces are provided between the plates to allow a working fluid 26 to flow therethrough. The working fluid 26 flows through the reservoir 34 connecting the heat exchanger plates 42. The plates 42 can have a substantially cylindrical configuration as shown or they can take other geometric tubular form.

The embodiment of FIG. 3 is particularly useful in the construction of isothermal fuel cells. For example, by using stack spacing elements between cell units, a uniform flow of reactants can be achieved.

Figure 4:
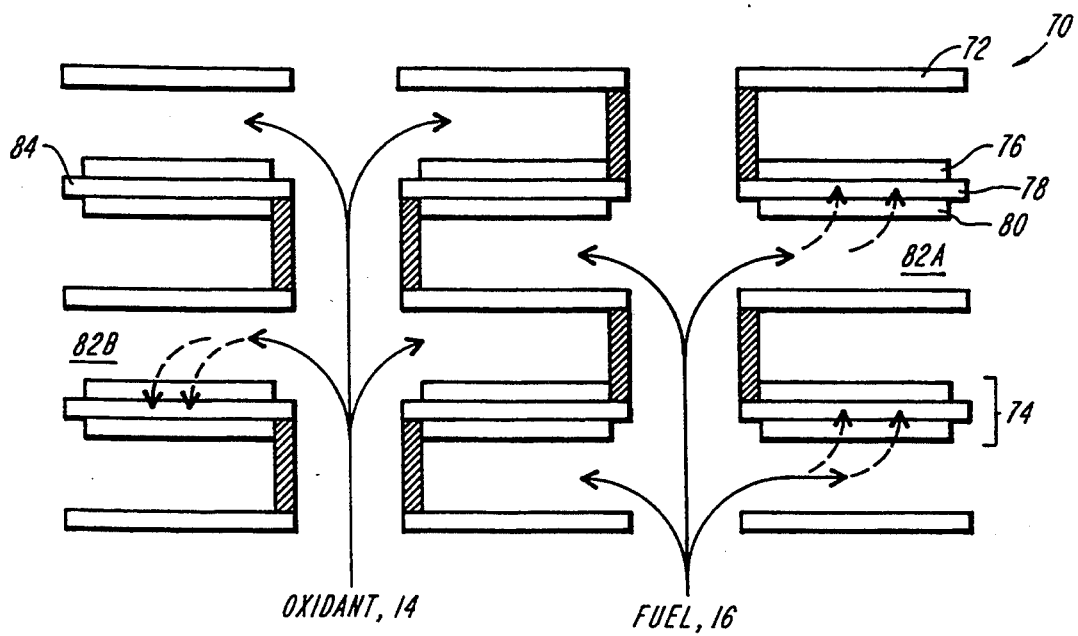
FIG. 4 is a cross-sectional side view of a fuel cell with isothermal reactant distribution according to the invention.

FIG. 4 is an illustration of how an isothermal heat source can be formed according to the invention. As shown, fuel cell 70 is formed from a series of stacked units, each of which includes interconnect plates 72 and electrolyte/electrode sandwiches 74. The sandwich structures include a first electrode 76, a gas permeable electrolyte 78 and a second electrode 80. Between each unit is a passage way 82A, 82B for gases. Seals 83 ensure that the fuel and oxidant gas streams are directed to opposite sides of sandwich structures 74. (Because of the annular nature of the stack elements, gases will circulate circumferentially to fill the entire cavity.) In an alternative embodiment, fuel can be delivered via an inner conduit and air or another oxidant delivered from the external environment. The extension 84 on the ends of the interconnect plates can serve to extract heat and thereby assist in thermal management. Although the system is shown in one operating mode with gases being distributed in an outstanding radial direction, it should be clear that the system can, likewise, be operated in the opposite (i.e., radially inward) mode, as well.

Figure 5:
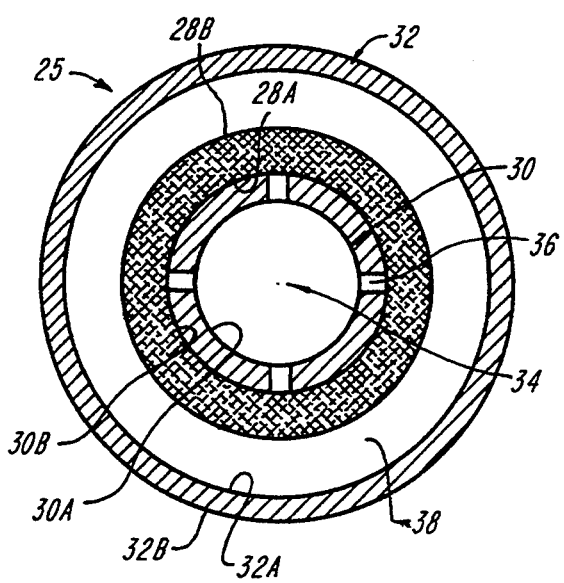
FIG. 5 is a cross-sectional end view of yet another apparatus according to the invention.

FIG. 5 shows a cross-sectional end view of another embodiment of the heat exchanger 20 for use in a system shown in FIG. 1. The heat exchanger 20 includes three concentric tubular structures that are preferably axially spaced as shown. The inner lumen 30 has a plurality of passageways 36 that extend between an inner face 30A and an outer face 30B. A sleeve structure 28 surrounds inner tube 30 and has an inner surface 28A and an outer surface 28B. The inner face 28A of sleeve 28 is in intimate facing contact with the outer surface of the inner tube 30, such that the transverse passageways 36 are in fluid communication with the porous sleeve 28. The transverse passageways 36 are evenly spaced apart.

Figure 5A:
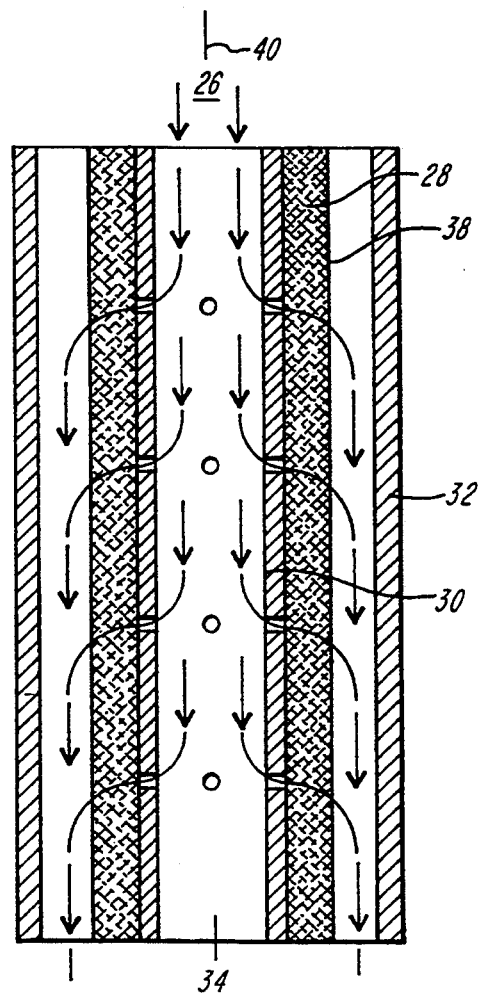
FIG. 5A is a cross-sectional side view of the apparatus of FIG. 4.

An outer tube 32 or wall element is disposed about the sleeve 28 and the inner tube 30, thereby forming a substantially co-axial geometry. The outer tube 32 has an internal surface 32A and an external surface 32B. The interior lumen of the inner tube 30 forms an elongate central passageway 34 that serves as a reservoir for the working fluid 26 as shown in FIG. 5A. The interior space between the internal surface of the outer tube 32A and the sleeve outer face 28B forms an elongate second passageway 38 that is substantially parallel to the central passageway 34.

The inner tube 30 and the outer tube 32 are preferably made of the same material, such as metal or ceramics. The porous sleeve structure 28 can be ceramic. Sleeve 28 serves to diffuse the flow of the working fluid from the inner lumen to the outer lumen.

Referring to FIG. 5A, the working fluid 26 flows through the elongate central passageway 34 that serves as a reservoir and which extends along a longitudinal axis 40. As the working fluid 26 flows through the reservoir 34, the working fluid is forced through the transverse passageways 36. The sleeve 28 overlies the transverse passageways 36 so as to receive that portion of the working fluid 26 that flows through the passageways 36. The working fluid 26 permeates radially outward through the porous sleeve 28 into the outer lumen 38 where the fluid is heated by an external heat source, e.g., a fuel cell assembly or other system which requires cooling. The working fluid 26 contained within the outer lumen 38 flows along the internal surface of the outer tube 32, and absorbs heat conductively transferred thereto from the external surface 32B. The outer tube's external surface 32B can be heated by being placed in direct contact with the fuel cell assembly 12, or by being radiantly coupled to the fuel cell 12. The distribution of the working fluid 26 along the internal surface 32A of the outer tube 32 provides for the effective transfer of heat between the working fluid 26 and the external environment. By selectively spacing the transverse passageways 36 along the inner tube 30, the working fluid 26 collected within the second passageway 38 maintains a constant temperature. The uniform distribution of the isothermic working fluid 26 along the inner surface 32A creates an isothermal condition along the external surface of the outer tube 32B. The passageway size and spacing are dependent upon the outer tube 32 and the inner tube 30 diameters.

The foregoing description describes the heat exchanger 25 as operating as a heat sink. Those of ordinary skill will realize that the heat exchanger 25 can also operate as a heat source. For example, the working fluid 26 can comprise a heated fluid rather than a coolant. As the heated fluid flows through the reservoir 34, heat is transferred from the external surface of the outer tube 32B to an external environment.

It should also be appreciated that the principles of the present invention can also be applied to construct isothermal fuel cells (and other electrochemical converters) by employing similar structures which distribute the reactants uniformly along the length of a fuel cell stack. The temperature of the stacks as a whole can be regulated and, when desired, rendered isothermal.

Figure 6:
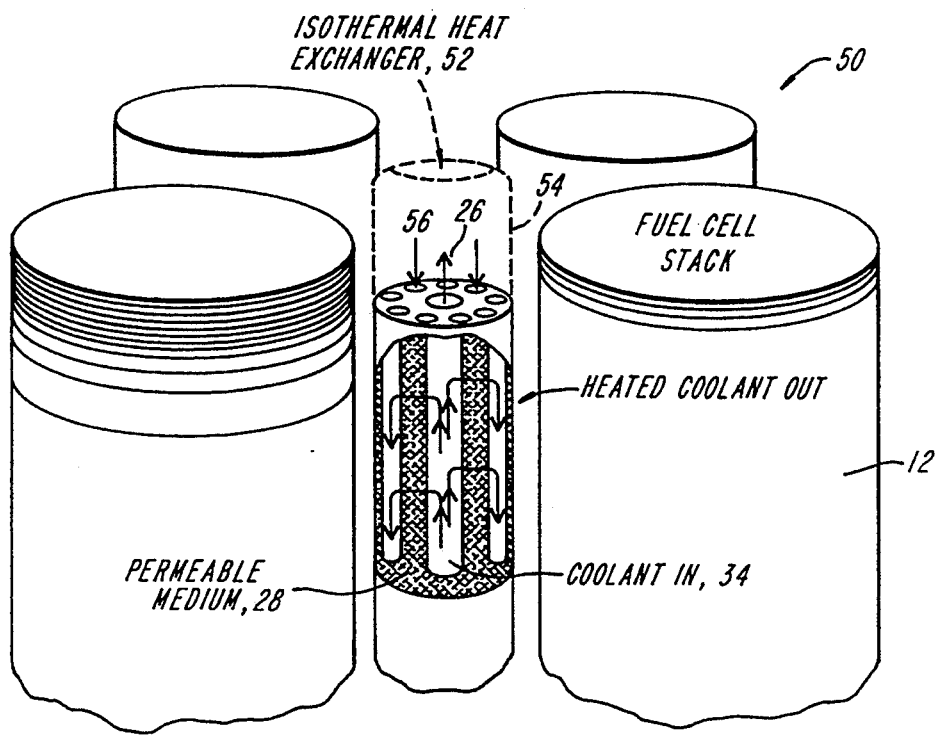
FIG. 6 is a simplified isometric view of a thermal control system employing a probe-like isothermal heat exchanger and a plurality of fuel cell assemblies.

FIG. 6 depicts a thermal management system 50 employing a plurality of fuel cell stacks 12 as an isothermal heat source and a columnar heat exchanger 52 as an isothermal heat sink. The columnar heat exchanger 52 includes an outer casing 54, a sleeve structure 28, and a plurality of counter-flow passageways 34,56. The combination of the heat exchanger 52 and the fuel cell stacks 12 represent an interdigitated array similar to that previously mentioned and described in U.S. Pat. No. 4,853,100, herein incorporated by reference. The thermally conductive medium 28 has a central passageway 34 formed substantially therethrough. Around the outer periphery of the medium 28 is a plurality of elongate counter-flow passageways 56 substantially parallel to the reservoir 34. The working fluid 26 flows through the reservoir 34 in the direction shown by the black arrows. The working fluid permeates substantially radially outward as it is heated by the thermal energy generated by the fuel cell stacks 12. The working fluid 26 collects in the counter-flow passageways 56 by the constraining force applied by the outer shell 54 on the working fluid 26. The heated working fluid 26 is uniformly distributed around the periphery of the medium 28, thereby forming a substantially uniform isothermal surface at the outer shell 54.

Figure 7:
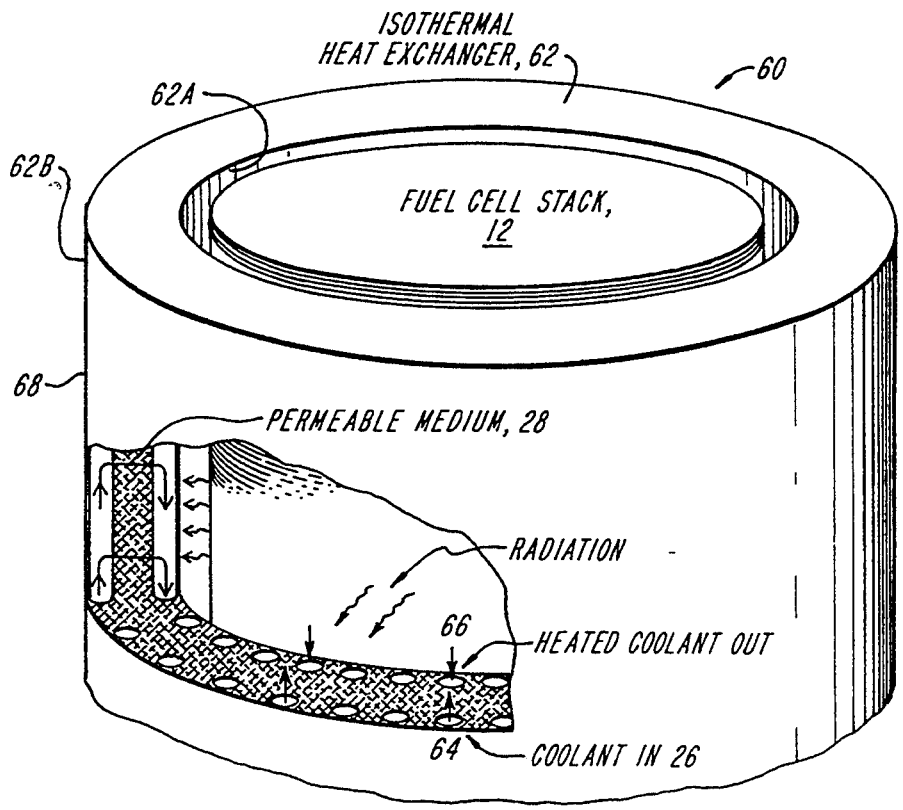
FIG. 7 is another isometric view of a thermal control system employing an annular isothermal heat exchanger and a fuel cell assembly.

FIG. 7 depicts another embodiment of a thermal control system 60 employing an isothermal heat exchanger 62. The heat exchanger 62 has a substantially annular configuration and surrounds a fuel cell stack 12, as shown. The heat exchanger 62 has an outer shell 68 and an inner thermally conductive medium 28. The medium 28 has a plurality of passageways 64,66 adjacent the inner and outer walls of the heat exchanger 62. A working fluid 26 flows through the inlet passageways 64 and collects in the outlet passageways 66.

The heat exchanger inner surface 62A is heated either by heat radiated by the fuel cell stack 12, as depicted by the wavy lines, or by direct contact with the adjacent fuel cell stack 12 or other heat source. Consequently, the medium 28 is heated, which in turn, provides heat to the working fluid 26.

The working fluid 26 enters from one or both ends of the passageways 64 that surround the outer periphery of the heat exchanger 62. The medium 26 collects within the counter-flow passageways 66 as the heat generated by the fuel cell 12 causes the working fluid 26 to permeate radially inward. Thus, the coolant fluid can be ducted out of the heat exchanger 62 for use in cogeneration systems or other various applications.

What is claimed is:

1. An energy system comprising:
   an electrochemical converter operating as a heat source; and
   a thermal control apparatus thermally integrated with said electrochemical converter having an isothermal surface temperature, said apparatus including
   a gas-permeable, thermally conductive medium;
   means for establishing a thermal gradient in said medium, said thermal gradient being generally normal to an isothermal boundary defined at one surface of said medium; and
   means for generating a flow of a working fluid through said medium, said flow being generally along the direction of said thermal gradient.

2. The system of claim 1 further comprising at least one of an associated heat sink, heat exchanger and heat exchanging surface, whereby thermal energy is transmitted from the medium by radiation or by contact to said heat sink.

3. The system of claim 1 further comprising a confined duct for receiving said working fluid after passage through said medium.

4. The system of claim 1 wherein the heated fluid flows from said medium into an open space.

5. The system of claim 1 wherein said permeable, thermally conducting medium comprises at least one of a plurality of flat, channeled, corrugated and convoluted plates, having passageways formed between the plates to allow said fluid to flow therethrough.

6. The system of claim 1 wherein said isothermal boundary constitutes at least one of a cylindrical and annular surface of a constant or a variable cross-section.

7. The system of claim 1 wherein the fluid comprises separately manifolded fuel and oxidant flows.

8. The system of claim 1 wherein the electrochemical converter operates as a burner, and wherein the heated fluid comprises a fuel gas and combustion occurs as the fluid exits the medium.

9. The system of claim 1 wherein the electrochemical converter comprises a converter selected from the group consisting of solid electrolyte fuel cells, molten carbonate fuel cells, phosphoric acid fuel cells, proton exchange membrane fuel cells, and alkaline fuel cells.

10. The system of claim 1 wherein the fluid flow is uniformly dispensed axially and azimuthally by a supplemental annular flow distribution tube, which is preferably an electrical insulator, and which introduces a radial pressure drop substantially greater than axial pressure drops incurred by said fluid entering and/or exiting the apparatus.

11. An energy system comprising:
an electrochemical converter assembly capable of operating either as a heat source or heat sink; and
a thermal control apparatus thermally integrated with said electrochemical converter having an isothermal surface temperature, said apparatus includes
a gas-permeable, thermally conducting medium;
means for establishing a thermal gradient in said medium, said thermal gradient being generally normal to an isothermal boundary defined at one surface of said medium; and
means for generating a flow of a working fluid within said medium, said flow being generally in the direction of said thermal gradient.

12. The system of claim 11 further comprising at least one of an associated heat source, heat exchanger and heat exchanging surface from which the medium receives thermal energy by radiation or by contact.

13. The system of claim 11 further comprising a confined duct for receiving working fluid after passage through the medium.

14. The system of claim 11 wherein the fluid flow exits into open space.

15. The system of claim 11 wherein said isothermal boundary constitutes at least one of a cylindrical and annular surface, of a constant or a variable cross section.

16. The system of claim 11 wherein said isothermal boundary constitutes at least one of a channeled, corrugated and convoluted surface, allowing contacts between the protrusions and a confining flow duct or a heat exchanging surface.

17. The system of claim 11 wherein fluid flows radially between two coaxial surfaces which bound said thermally conducting, permeable medium.

18. The system of claim 11 wherein the fluid flow is uniformly dispensed axially and azimuthally by a supplemental annular flow distribution tube, which introduces a radial pressure drop substantially greater than all axial pressure drops incurred by said fluid entering and/or exiting the apparatus.

19. The system of claim 11 wherein said fluid flows radially outward.

20. The system of claim 19 further comprising a thermally conducting cylindrical shell enclosing the system, said shell being disposed coaxially with said apparatus.

21. The system of claim 19 wherein said system is disposed in the vicinity of a radiant thermal source for extracting thermal energy from said source.

22. The system of claim 11 wherein said fluid flows radially inward.

23. The system of claim 22 wherein the system is enclosed by an annular, cylindrical enclosure, with a thermally conducting inner shell.

24. The system of claim 22 wherein the system surrounds a thermal source for extracting thermal energy from said source.

25. The system of claim 11 wherein said permeable, thermally conducting medium is comprised of at least one of a plurality of flat, channeled, corrugated and convoluted plates, forming passageways between the plates to allow said fluid to flow through.

26. The system of claim 25 wherein said conducting medium plates are continuations of the interconnector plates of the electrochemical converter.

27. The system of claim 26 wherein said apparatus is used to preheat oxidant entering the electrochemical converter.

28. The system of claim 26 wherein said apparatus is used to preheat fuel entering the electrochemical converter.

29. The system of claim 28 wherein said conducting medium plates are coated with a fuel reforming catalyst.

30. The system of claim 25 wherein said conducting medium plates are continuations of the outer periphery of the interconnector plates of the electrochemical converter.

31. An energy system comprising:
an electrochemical converter operating as a heat source receiving thermal energy from at least one of a heat exchanger, a heat exchanging surface and a heat source; and
a thermal control apparatus thermally integrated with said electrochemical converter having an isothermal surface temperature, said apparatus including
a gas-permeable, thermally conductive medium;
means for establishing a thermal gradient in said medium, said thermal gradient being generally normal to an isothermal boundary defined at one surface of said medium; and
means for generating a flow of working fluid within said medium, said flows being generally in the direction of said thermal gradient.

32. The system of claim 31 wherein the thermal energy is made available from a group of heat producing processes comprising at least one of a combustion, solar energy concentration, nuclear fission and fusion.

33. An energy control system comprising
an electrochemical converter; and
a thermal control apparatus having an open plenum in which the wall element has a network of pores which distribute the working fluid to the external environment thermally integrated with said electrochemical converter having an isothermal surface temperature, said apparatus including
a structure for exchanging heat between a working fluid and an external environment, said structure comprising at least one wall element having an external surface exposed to said external environment and an internal surface exposed to said working fluid whereby heat can be exchanged between said environment and said working fluid;
reservoir means coupled to said structure for containing a reservoir of said working fluid; and
distribution means for distributing said working fluid along said wall element to provide isothermal heat exchange.

34. The system of claim 33 wherein said structure is a tubular structure, and said wall element is an outer tube wall which separates said medium from said environment.

35. The system of claim 33 wherein said structure is a double-lumen tubular structure having an inner lumen which provides a reservoir for said working fluid.

36. The system of claim 33 wherein the distribution means comprising a structure with pores for distributing said working fluid to an outer lumen where heat is exchanged between said working fluid and said external environment.

37. The system of claim 33 wherein the distribution means comprises a plurality of passageways axially spaced along an inner tube for distributing said working fluid to an outer lumen where heat is exchanged between said working fluid and said external environment.

38. The system of claim 37 wherein the inner tube is a multi-plate structure in which spaces between said plates provide said passageways.

39. The system of claim 33 wherein said tubular element further comprises an inlet for introduction of said working fluid at a first end and outlet for removal of said working fluid at a second end.

40. The system of claim 33 wherein said thermal control apparatus further comprises:
means for introducing said medium into said first end of said tubular element, and
means for extracting said working fluid from said second end of said tubular element.

41. The system of claim 33 wherein said thermal control apparatus is a heat source and said working fluid is a heated fluid.

42. The system of claim 33 wherein said thermal control apparatus is a heat sink and said working fluid is a coolant.

43. The system of claim 33 further comprising:
a double-lumen tubular structure including an inner tube having an outer lumen surface which provides a reservoir for said working fluid, and
a porous sleeve structure concentrically disposed about said inner tube, said sleeve structure being in intimate contact with said lumen tube.

44. The system of claim 43 wherein said sleeve structure is a porous thermal medium for uniformly distributing said working fluid to said outer lumen, said outer lumen being in fluid communication with an outer tube wall where heat can be exchanged between said working fluid and an external environment.

* * * * *